United States Patent [19]

Burke et al.

[11] Patent Number: 4,633,316
[45] Date of Patent: Dec. 30, 1986

[54] STABLE LOW COST 4.5 MHZ REMODULATOR

[75] Inventors: Dennis E. Burke, Elk Grove Village; John A. Lund, McHenry, both of Ill.

[73] Assignee: Zenith Electronics Corporation, Glenview, Ill.

[21] Appl. No.: 671,271

[22] Filed: Nov. 14, 1984

[51] Int. Cl.$^4$ .................................................. H04N 5/62
[52] U.S. Cl. ................................................ 358/197; 455/260
[58] Field of Search ............ 358/197, 198, 188, 194.1; 455/131, 260

[56] References Cited

U.S. PATENT DOCUMENTS

| | | | |
|---|---|---|---|
| 2,880,269 | 3/1959 | Dome | 178/5.8 |
| 2,937,232 | 5/1960 | Parker | 178/5.8 |
| 3,538,245 | 11/1970 | Parker | 178/5.8 |
| 3,564,125 | 2/1971 | Avins | 178/5.8 |
| 3,711,652 | 1/1973 | Metro | 179/15 BT |
| 3,714,594 | 1/1973 | Adler | 329/117 |
| 3,714,595 | 1/1973 | Denenberg | 392/122 |
| 3,805,192 | 4/1974 | Ocnoschek | 332/16 R |
| 3,939,424 | 2/1976 | Shimuzu | 325/346 |
| 3,962,649 | 6/1976 | Fischman | 329/103 |
| 4,009,455 | 2/1977 | Ishigaki | 332/18 |
| 4,017,676 | 4/1977 | Rabeler | 358/196 |
| 4,052,672 | 10/1977 | Enderby | 325/147 |
| 4,074,209 | 2/1978 | Lysobey | 332/19 |
| 4,131,861 | 12/1978 | Malaviya | 331/2 |
| 4,156,255 | 5/1979 | Hongu | 358/195 |
| 4,163,259 | 7/1979 | Skerlos | 358/191 |
| 4,199,786 | 4/1980 | Orii | 358/197 |
| 4,199,787 | 4/1980 | Craft | 358/197 |
| 4,237,485 | 12/1980 | Saito | 358/197 |
| 4,253,118 | 2/1981 | Flaza | 358/188 |
| 4,253,119 | 2/1981 | Jones | 358/188 |
| 4,258,391 | 3/1981 | Papay | 358/197 |
| 4,270,221 | 5/1981 | Daniel | 455/208 |
| 4,305,157 | 12/1981 | Mogi | 458/183 |
| 4,322,751 | 3/1982 | Hongu | 358/195.1 |
| 4,349,842 | 9/1982 | Apeldoorn | 358/197 |
| 4,387,351 | 6/1983 | Furiga | 332/19 |
| 4,395,734 | 7/1983 | Rypkema | 358/198 X |
| 4,410,864 | 10/1983 | Muterspaugh | 333/32 |
| 4,442,415 | 4/1984 | Ashida | 332/16 T |
| 4,455,573 | 6/1984 | Yamamato | 358/198 |
| 4,470,071 | 9/1984 | Rindal | 358/197 X |
| 4,490,743 | 12/1984 | Mycynek et al. | 358/197 |
| 4,551,756 | 11/1985 | Ogawa et al. | 358/197 |

Primary Examiner—Howard W. Britton
Assistant Examiner—Victor R. Kostak

[57] ABSTRACT

A cable converter produces a 4.5 MHz intercarrier sound signal from a received television signal for application to one input of a phase lock loop circuit, the other input of which is supplied from a voltage controlled oscillator producing a regenerated 4.5 MHz intercarrier signal. The output of the phase lock loop is supplied through a loop filter to the input of the voltage controlled oscillator to control its frequency. The regenerated 4.5 MHz intercarrier signal is thus stabilized by the received 4.5 MHz intercarrier signal.

6 Claims, 2 Drawing Figures

STABLE LOW COST 4.5 MHZ REMODULATOR

BACKGROUND OF THE INVENTION AND PRIOR ART

This invention relates in general to phase lock loop (PLL) circuits and, specifically, to PLL circuits used in remodulators in systems processing television signals.

The invention will find its primary use in a cable converter, where a plurality of television signals are selectively converted to a television frequency corresponding to VHF channel 2, 3 or 4 for application to the input of a conventional television receiver. It will be appreciated that video cassette recorders (VCRs) have this same capability and may also benefit from the invention. The invention is of particular interest in cable converter or home terminal systems in which the audio information in the television signal is demodulated for further processing and/or control. In particular, one well-known cable system enables a subscriber to remotely control the level of the television audio signal and to mute the audio signal in addition to changing channels. In that system, the received television signal is demodulated or detected to produce a baseband video signal and a 4.5 MHz intercarrier sound signal from which the FM modulated audio is recovered and processed. After suitable processing and control, the baseband video signal and a regenerated 4.5 MHz intercarrier signal, that is modulated with the processed audio signal, are supplied for remodulation onto a carrier at VHF channel 2/3/4 frequency.

The prior art is replete with PLL circuits for controlling the frequency of voltage controlled oscillators (VCOs). Generally if stability is required, as in NTSC television signals, a crystal is used as a reference for the PLL. The art also includes PLL circuits that are controlled by injection of an external frequency. In present cable converters having a 4.5 MHz frequency modulated oscillator incorporated in a remodulator, the oscillator is normally controlled by a passive LC network. The invention envisions using the very stable 4.5 MHz intercarrier sound signal in the received television signal as the reference for a stable regenerated 4.5 MHz signal source in the remodulator.

OBJECTS OF THE INVENTION

A principal object of this invention is to provide a novel stability reference for a 4.5 MHz intercarrier remodulator.

Another object of this invention is to provide a low cost cable converter.

SUMMARY OF THE INVENTION

In accordance with the invention, there are provided means for receiving and detecting a television signal and producing a received 4.5 MHz intercarrier sound signal and an audio signal recovered therefrom for processing. Remodulator means for regenerating a 4.5 MHz intercarrier signal, for modulation by the processed audio signal are provided and include a VCO having a nominal frequency of 4.5 MHz. The VCO is controlled by a PLL having a phase detector with a first input supplied with the received 4.5 MHz intercarrier signal and a second input coupled to the VCO. The arrangement enables the regenerated 4.5 MHz intercarrier signal to be "slaved to" and stabilized by the received 4.5 MHz intercarrier sound signal.

BRIEF DESCRIPTION OF THE DRAWINGS

Further objects and advantages of the invention will be apparent upon reading the following description in conjunction with the drawings in which.

DESCRIPTION OF THE PREFERRED EMBODIMENT

Figure 1:
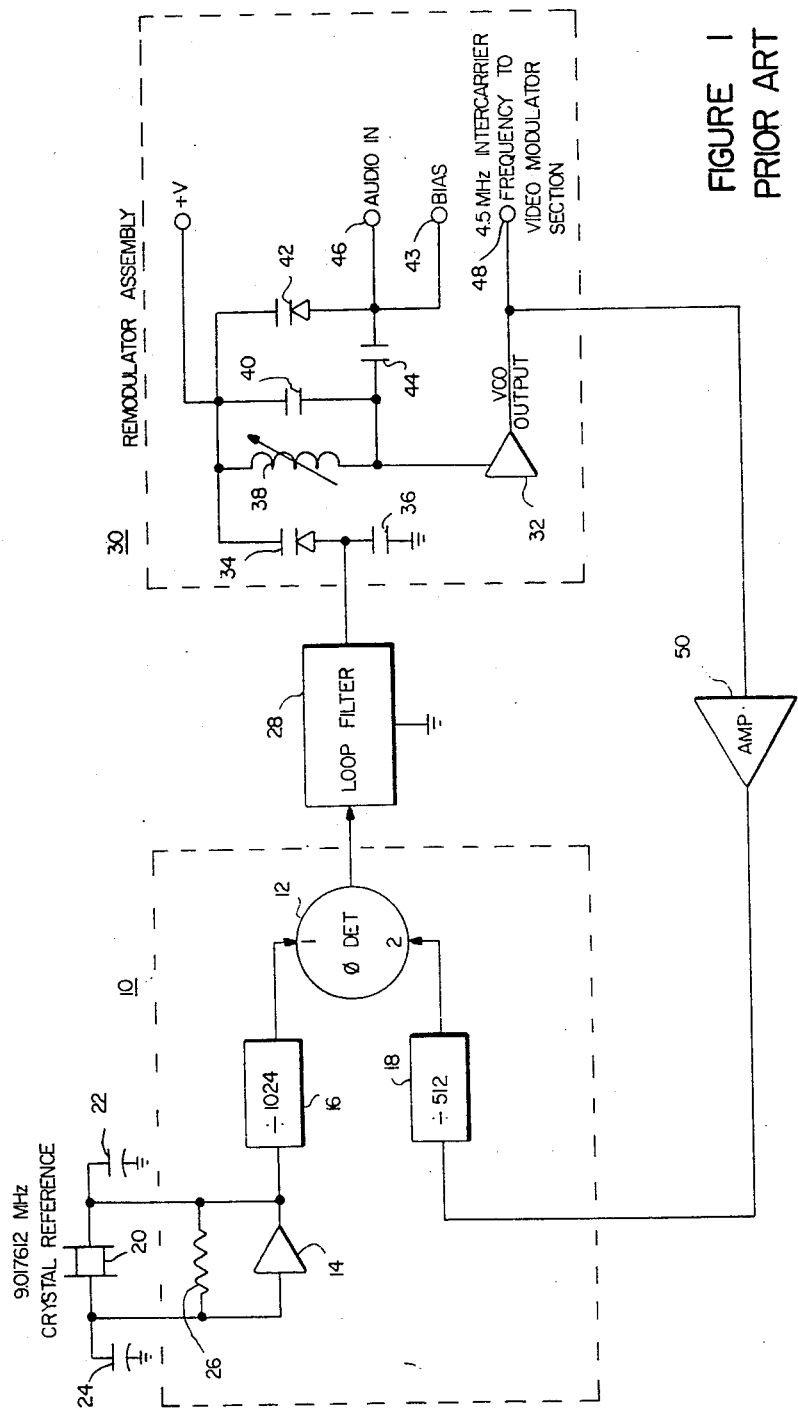
FIG. 1 is a partial schematic diagram of a prior art PLL controlled remodulator circuit.

Referring to the prior art circuit of FIG. 1, a PLL circuit fabricated as a monolithic integrated circuit (IC), generally designated by reference numeral 10, includes a phase detector 12, an amplifier 14, a first frequency divider 16, coupled between the output of amplifier 14 and a first input of phase detector 12, and a second frequency divider 18 coupled between the input of the PLL and a second input of the phase detector. Th PLL includes a reference crystal 20 coupled to ground through capacitors 22 and 24. The junction of crystal 20 and capacitor 24 is coupled to the input of amplifier 14. A feedback resistor 26 is connected across the amplifier in a conventional manner. This arrangement is well known in the art with crystal 20 providing a stable reference frequency for the PLL. The phase detector compares the signals at its two inputs and develops an error signal as a function of the comparison. The output of the phase detector is supplied to a loop filter 28 which removes all but the frequencies of interest.

The output of the loop filter is coupled to a remodulator 30, specifically to the junction of a varactor diode 34 and a capacitor 36, which is coupled to ground. Varactor diode 34 is coupled to a DC voltage source which also supplies a tuned circuit, comprising an adjustable inductance 38 coupled in parallel with a capacitor 40, for controlling oscillation of an amplifier which functions as a VCO 32. The nominal frequency of oscillation of VCO 32 is 4.5 MHz. The output of the VO is supplied to a terminal 48 and, through an amplifier 50, to the input of PLL 10. The 4.5 MHz regenerated frequency from the VCO is divided by frequency divider 18 and compared by phase detector 12 with the divided-down frequency of crystal 20. Thus, the frequency of VCO 22 is locked to the frequency determined by crystal 20.

The 4.5 MHz oscillation of the VCO is FM modulated by a signal supplied to an audio input terminal 46 and coupled to a capacitor 44 and to another varactor diode 42. The junction of varactor diode 42 and capacitor 44 is coupled to a bias terminal 43. The input audio signal varies the bias on varactor diode 42 which changes its capacitance. Since capacitor 44 is part of the tuned circuit for the VCO, its change in capacitance causes a change in frequency of VCO 32. Hence, the frequency of VCO 32 is modulated by the audio input signal. As is well known, such a circuit provides a stable 4.5 MHz center frequency for VCO 32 that is FM modulated as a function of the audio input signal at terminal 46.

Figure 2:
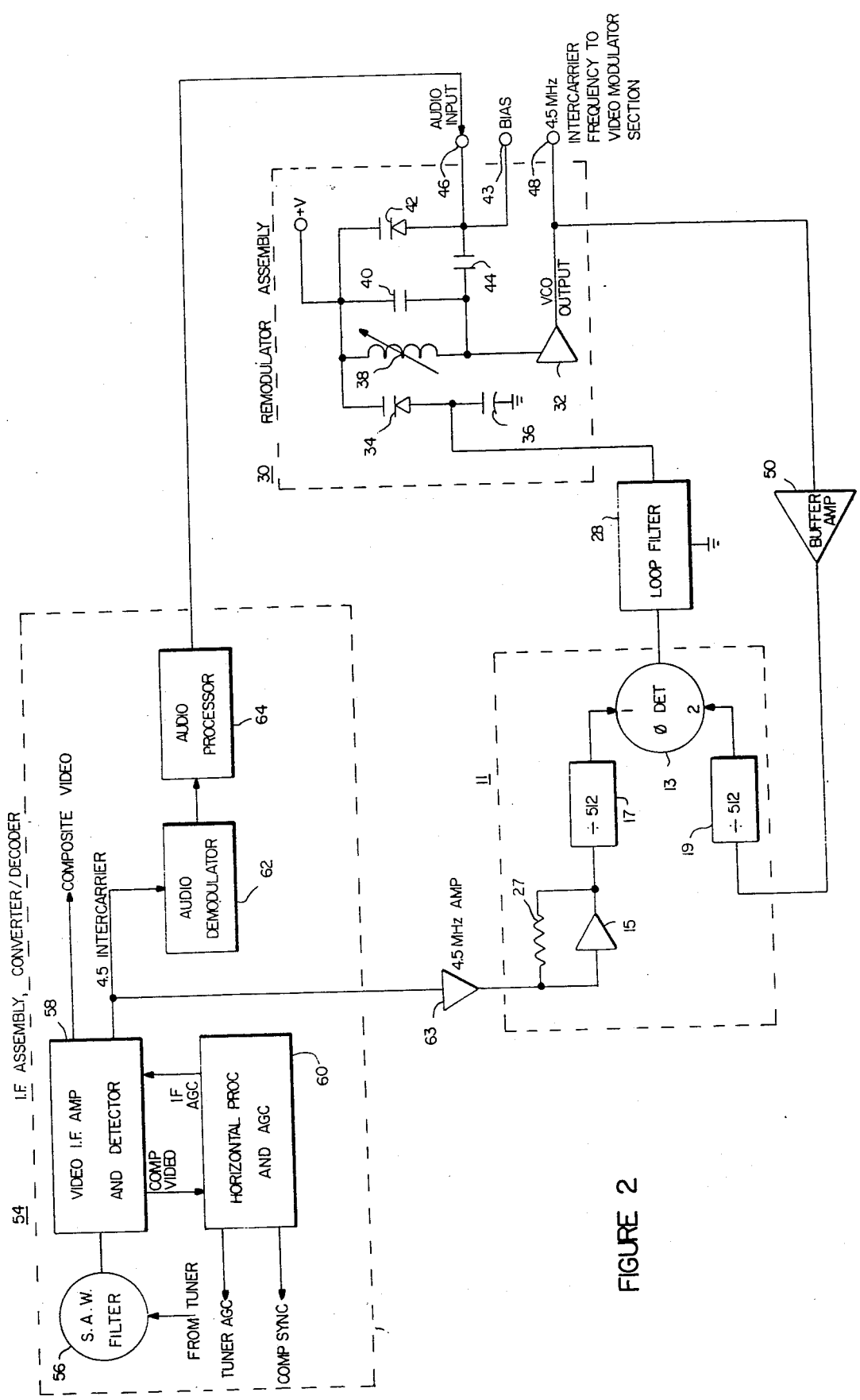
FIG. 2 is a partial schematic diagram of a cable converter with a remodulator circuit constructed in accordance with the invention.

In FIG. 2, dashed line block 54 represents a portion of a cable converter. A signal is received from a tuner (not shown), supplied to a surface acoustic wave (SAW) filter 56 and to a video IF amplifier and detector circuit 58, where the composite video signal, the 4.5 MHz intercarrier, sync, and IF AGC signals are developed in conjunction with a sync/scan and AGC processor 60.

The 4.5 MHz intercarrier sound signal is supplied to an audio demodulator 62 where baseband audio is produced and supplied to an audio processor 64. As mentioned, audio processor 64 may include circuitry for adjusting the level of the baseband audio signal and for muting the signal in accordance with a subscriber's preference. For example, the audio level may be adjusted and when the signal is remodulated and supplied to a television receiver, the new audio level will be detected by the receiver. Thus audio control of the television sound is accomplished without adjusting the television receiver volume control. The output of audio processor 64 is a modified baseband audio signal that is used to modulate the regenerated 4.5 MHz intercarrier signal. It is supplied to audio input terminal 46 of remodulator 30.

Remodulator 30 is seen to be identical to that of FIG. 1 as is loop filter 28 and other like-numbered elements. PLL circuit 11 is substantially the same as PLL circuit 10 with the exception that in the preferred embodiment, PLL 11 is not supplied with a crystal reference. On the contrary, the received 4.5 MHz intercarrier sound signal is supplied through a 4.5 MHz amplifier 63 to the input of feedback amplifier 15 and, through a frequency divider 17, to the first input of a phase detector 13. Thus, the stabilizing reference frequency is supplied from the received television signal and not from a separate crystal.

The output of VCO 32 is supplied through a buffer amplifier 50 to PLL 11, specifically to the input of divider 19, which, in the preferred implementation, is fabricated in the monolithic IC. The output of divider 19 is supplied to the second input of phase detector 13. Thus, phase detector 13 compares its two 4.5 MHz related input signals, and produces an output that varies as a function of the phase differential between them. VCO 32, which regenerates the 4.5 MHz intercarrier for the remodulator, is therefore controlled or stabilized to the same degree that the transmitted and received 4.5 MHz intercarrier sound signal is controlled. This is possible since the television signal emanates from either a broadcast television transmitter or from a cable head-end transmitter, both of which are closely regulated in frequency and phase.

It will be appreciated that not only is excellent remodulator 4.5 MHz intercarrier stability obtained in a simple, cost effective manner, but fabrication of the PLL as a monolithic IC makes a very attractive package for use in a cable converter.

It is recognized that numerous modifications and changes in the described embodiment of the invention will be apparent to those skilled in the art without departing from the true spirit and scope thereof. The invention is to be limited only as defined in the claims.

What is claimed is:

1. In combination:
   means for receiving and detecting a television signal to provide a received 4.5 MHz intercarrier sound signal and a baseband audio signal recovered therefrom;
   remodulator means for regenerating a 4.5 MHz intercarrier signal for modulation by said audio signal;
   a voltage controlled oscillator in said remodulator means having a nominal frequency of 4.5 MHz for developing said regenerated 4.5 MHz intercarrier signal; and
   a phase lock loop including a phase detector having an output coupled to said voltage controlled oscillator, a first input supplied with said received 4.5 MHz intercarrier signal, and a second input coupled to the output of said voltage controlled oscillator;
   whereby said regenerated 4.5 MHz intercarrier signal is stabilized by said received 4.5 MHz intercarrier sound signal.

2. The combination of claim 1 further including:
   a cable converter, said cable converter including said means for receiving and detecting a television signal; and
   means in said cable converter for processing said baseband audio signal and producing a modulating audio signal.

3. The combination of claim 2 wherein said means for processing said baseband audio signal is coupled to said remodulator means and wherein said modulating audio signal modulates said regenerated 4.5 MHz intercarrier signal.

4. The combination of claim 3 further including:
   filter means coupled between the output of said phase detector and the input of said voltage controlled oscillator; and
   a buffer amplifier coupled between the output of said voltage controlled oscillator and said second input of said phase detector.

5. The combination of claim 4 wherein said phase lock loop is fabricated as monolithic integrated circuit.

6. A cable converter comprising:
   means for receiving and detecting a television signal to provide a received 4.5 MHz intercarrier sound signal and a baseband audio signal recovered therefrom;
   means for processing said baseband audio signal and producing a modulating audio signal;
   remodulator means, for developing a regenerated 4.5 MHz intercarrier signal, including a voltage controlled oscillator having a nominal frequency of 4.5 MHz and an input terminal coupled to said processing means for receiving said modulating audio signal;
   a monolithic integrated circuit phase lock loop including a phase detector having an output coupled to said voltage controlled oscillator, a first input coupled to a first frequency divider receiving said received 4.5 MHz intercarrier sound signal and a second input coupled to a second frequency divider receiving the output of said voltage controlled oscillator; and
   a loop filter coupled between the output of said phase detector and another input of said voltage controlled oscillator.

* * * * *